Figure 1:
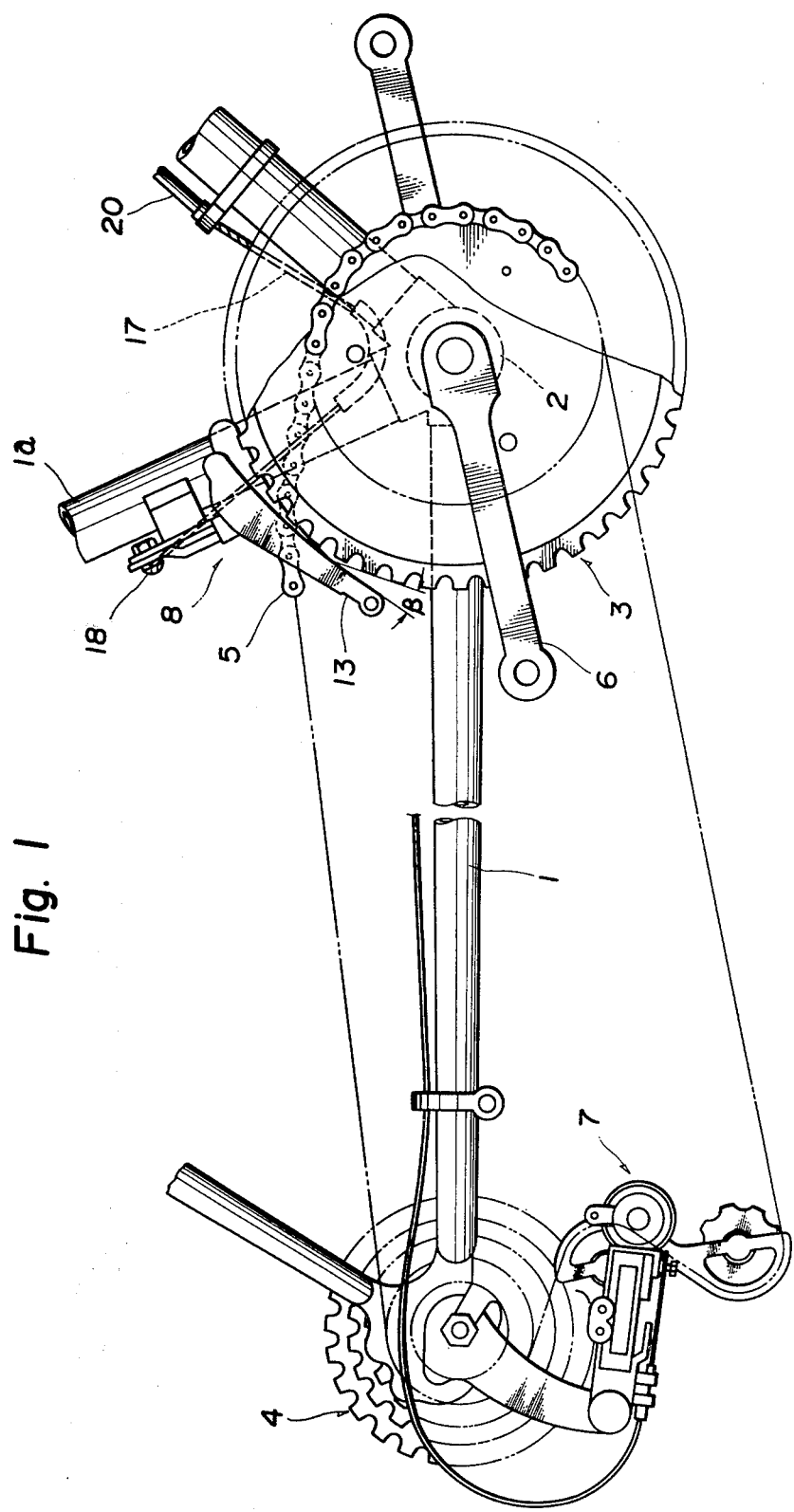

United States Patent [19]

Isobe

[11] 4,199,997
[45] Apr. 29, 1980

[54] FRONT DERAILLEUR

[75] Inventor: Mitsuhide Isobe, Toyonaka, Japan

[73] Assignee: Shimano Industrial Company Limited, Osaka, Japan

[21] Appl. No.: 879,885

[22] Filed: Feb. 21, 1978

[30] Foreign Application Priority Data

Feb. 21, 1977 [JP] Japan ................................ 52-18334

[51] Int. Cl.² ..................... B62M 9/12; B62M 25/00; F16H 11/08
[52] U.S. Cl. .................................. 74/217 B; 280/236
[58] Field of Search .................. 74/217 B; 403/61, 59, 403/91; 280/236, 238, 289 R, 289 H

[56] References Cited

U.S. PATENT DOCUMENTS

| 628,743 | 7/1899 | Biggs | 403/59 |
| 2,697,975 | 12/1954 | Buhr | 403/61 |
| 3,992,054 | 11/1976 | Campagnolo | 403/91 |
| 4,030,374 | 6/1977 | Isobe | 74/217 B |

FOREIGN PATENT DOCUMENTS

| 825812 | 12/1951 | Fed. Rep. of Germany | 74/217 B |
| 1164788 | 10/1958 | France | 74/217 B |

Primary Examiner—Nile C. Byers, Jr.
Assistant Examiner—David C. Reichard
Attorney, Agent, or Firm—Stevens, Davis, Miller & Mosher

[57] ABSTRACT

A front derailleur for a bicycle, which is used for switching a driving chain to at least two sprockets provided at a crank, comprises a fitting member fixed to the bicycle frame extending substantially vertically of the bicycle body, a speed-change mechanism having a chain guide and connected to the fitting member, a first adjusting device for adjusting the chain guide in its position with respect to each of the sprockets in radial direction thereof, a second adjusting device for adjusting an angle of the line extending longitudinally of the chain guide with respect to the axis of each of the sprockets, and a holding device for fixing a support of the shifting mechanism at a desirable position on a fitting face of the fitting member, the fitting member being fixed non-movably at a given position of the bicycle frame with the shifting mechanism being adjusted by being moved longitudinally of the bicycle frame and on a plane perpendicular thereto, so that the chain guide may be positioned most properly with respect to each of the sprockets.

13 Claims, 5 Drawing Figures

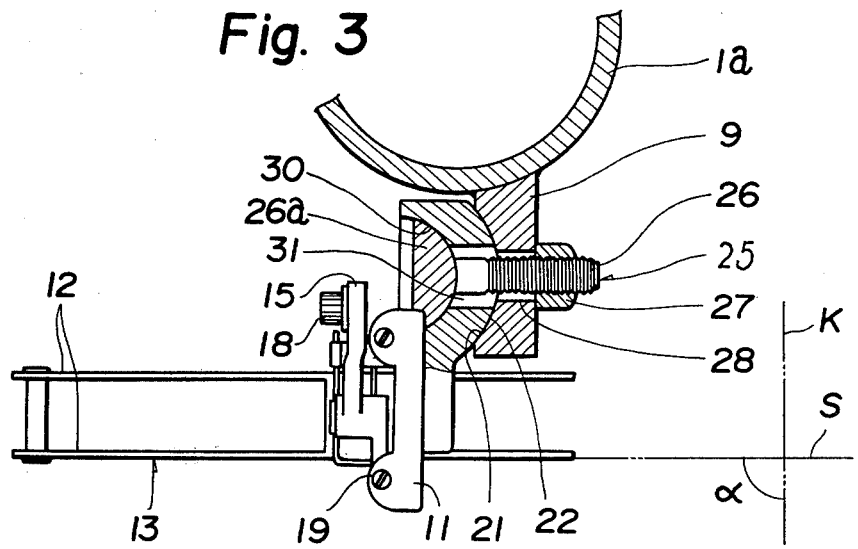
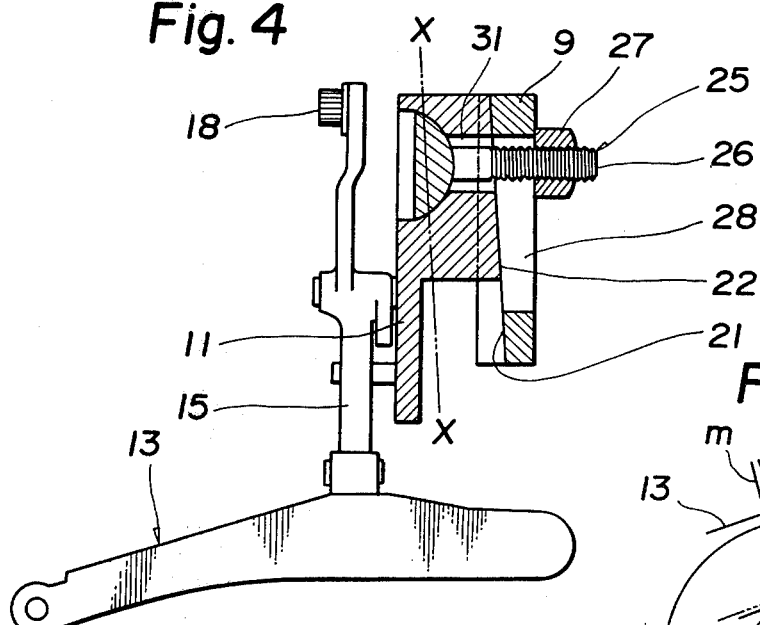
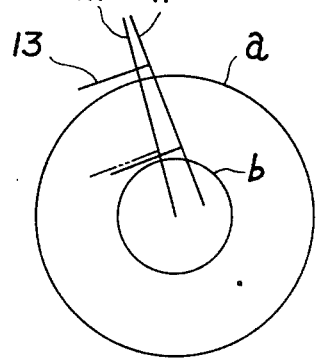

FRONT DERAILLEUR

This invention relates to a front derailleur for a bicycle and more particularly to a front derailleur for switching a driving chain to at least two sprockets attached to a crank means of the bicycle.

Conventionally, a speed-change device having two derailleurs one at the rear sprockets and one at the front sprockets, has been provided for the multi-speed transmission of the bicycle.

This kind of speed-change device has the front derailleur mounted to the bicycle frame by means of a tightening band held by a bolt. This mounting makes it hard to keep a chain guide at a proper position because the guide is shaking when attached, and it takes a substantial amount of time to complete the mounting. The band, once attached, peels off paint on the bicycle frame allowing it to slide and turn when remounted, resulting in not positively securing the front derailleur to the frame and giving the bicycle a poor appearance. Furthermore, it is necessary for the band to be changed for every different diameter frame, which is very troublesome and expensive to produce.

This invention has been designed to eliminate the aforesaid defects caused by using the tightening band. An object of the invention is to provide a front derailleur capable of; being attached to the bicycle frame without the tightening band; having the chain guide kept accurately at the most proper position for changing the speed in correspondence to each of the sprockets attached to a crank regardless of the size of sprocket; and being mounted easily and firmly at the best selected position regardless of different diameter bicycle frames thus resulting in a low production cost.

The invention is characterized in that, firstly, the front derailleur of the invention is composed of a shifting mechanism including the chain guide and a fitting member for fitting the shifting mechanism to the bicycle frame, which fitting member is rigidly fixed to the frame extending substantially vertically of the bicycle body; secondly, the fitting member is provided with a fitting face extending lengthwise of the frame and a support at the shifting mechanism is provided with a connecting face facing the fitting face and between the fitting and connecting faces are provided a first and a second adjusting means so that the shifting mechanism, especially the position of the chain guide with respect to each of the sprockets, may be adjusted, and thirdly the first adjusting means by which the chain guide has its position adjusted with respect to each of the sprockets in a radial direction thereof is so constituted that one of the fitting and the connecting faces has a vertical length larger than the radially adjustable length to thereby allow the connecting face to be movable upwardly and downwardly with respect to the fitting face, and the second adjusting means for adjusting an angle of line longitudinally of the chain guide with respect to the axis of each of the sprockets is constituted of concave and convex faces formed at the fitting and connecting faces respectively in relation of surrounding the straight line extending vertically of the latter face, and between the fitting member and support is provided a fixing means for fixing the support of the shifting mechanism at its position adjusted by the first and second adjusting means so that the support may be fixed by the fixing member at a desirable position on the fitting face of the fitting member.

Figure 2:
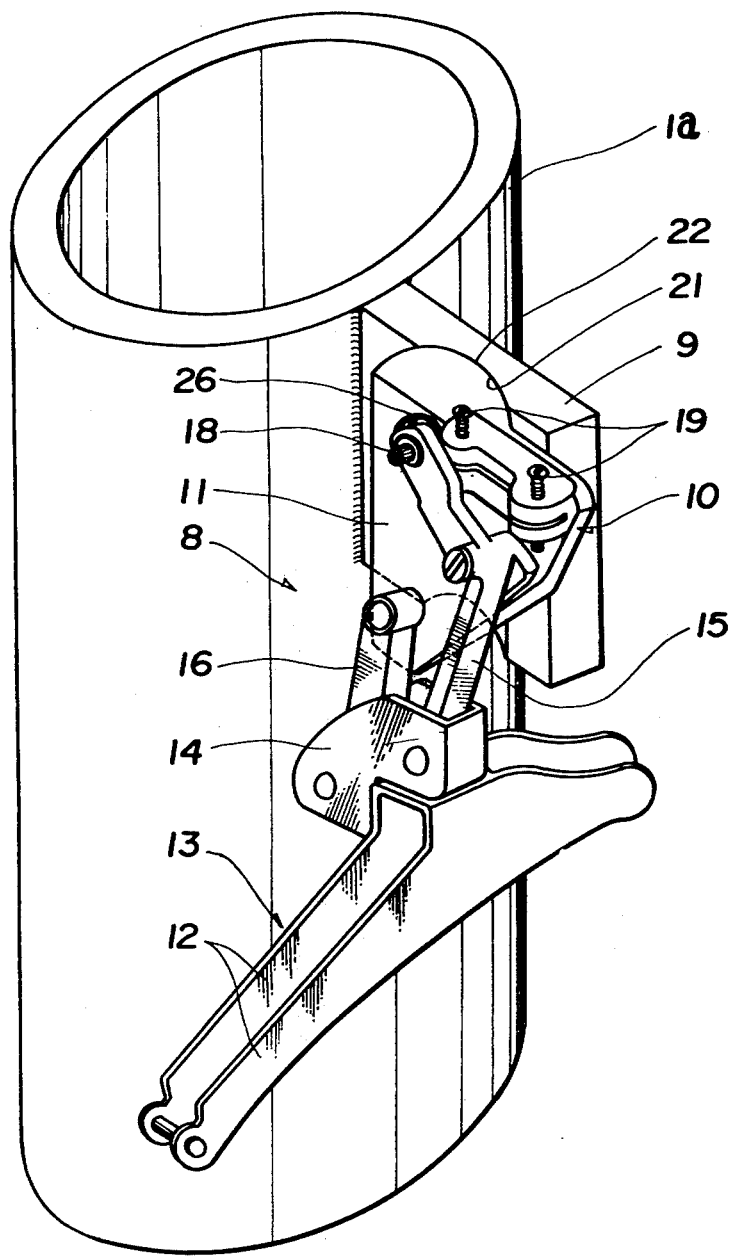

These and other objects and advantages of the invention will become more apparent in the detailed description taken in accordance with the accompanying drawings, in which:

FIG. 1 is a side view generally showing the transmission of a bicycle, to which the front derailleur of the invention is applied, FIG. 2 is a perspective view of an embodiment of the front derailleur of the invention, which is attached to the bicycle frame, FIG. 3 is a plan view showing the partially omitted frame and the partially cutaway derailleur, FIG. 4 is a partially cutaway front view of the fitting member and support without the frame in FIG. 2, and FIG. 5 is a diagram of the adjustment of chain guide position radially with respect to the sprocket.

Referring to FIG. 1, the transmission of the bicycle is generally shown, which includes the front derailleur of the invention; the reference numeral 1 designates the bicycle frame. At the forwardly lower portion of the bicycle frame 1 is provided a bottom bracket 2 supporting a crank shaft through which a plurality of different diameter sprockets 3 are journaled to the bottom bracket. The rear of the bicycle likewise includes a plurality of different diameter sprockets 4. A driving chain 5 is stretched across one each of the front sprockets 3 and rear sprockets 4, and a crank arm 6 is connected to the sprockets 3. By operating a rear derailleur 7 at the rear of the frame or the front derailleur 8 of the invention at the front, the chain 5 can be switched to a selected one of the sprockets 3 and 4.

Now, the front derailleur 8 of the invention, which is attached to a seat tube 1a extending upwardly of the bicycle frame 1 and is operated to change the bicycle speed in association with the rear derailleur, is composed mainly of a fitting member 9 fixed to the seat tube 1a and a shifting mechanism 10 carried by the fitting member. The shifting mechanism 10 comprises, like conventional front derailleurs, a support 11 connected to the fitting member 9, a chain guide 13 having a guide plate 12 extending lengthwise of the seat tube 1a to guide the driving chain 5, a movable member 14 carrying the chain guide 13, and connecting members 15 and 16 carrying the movable member in relation of being movable axially of each of the sprocket 3 with respect to the fitting member 9 and toward at least two positions corresponding to each of the sprockets 3. The support 11, two connecting members 15 and 16, and movable member 14, are connected to form a parallelogram as shown in FIG. 2. Between the fitting member 9 and one of two connecting member 15 and 16, or the movable member 14 and the latter, is inserted a return spring (not shown) for urging the movable member 14 toward the smaller diameter sprocket 3. One of the connecting members 15 and 16 is, as shown in FIG. 2, extended to have at the utmost end of the extension a retainer 18 for a control wire 17. The wire 17 is pulled against the return spring to swing the connecting members 15 and 16 to thereby move the chain guide 13 axially of each of the sprockets 3 and toward two positions corresponding thereto, in particular, from the position corresponding to the smaller diameter sprocket to the larger diameter one. When the pulled wire 17 is released the chain guide 13 is moved reversely, i.e., from the larger diameter sprocket to the smaller diameter one to thereby switch the chain 5 to one of the sprockets 3. In addition, the reference numeral 19 designates a stopper provided at the support 11, and 20, an outer sheath for guiding the wire 17, whose end is fixed to the frame 1 as shown in FIG. 1.

The fitting member 9 is formed mainly of a square or oblong metallic plate of a suitable thickness, which is fixed to the seat tube 1a mainly by welding in relation that one thickness side of the plate is contacted with the surface of the seat tube 1a in the longitudinal direction thereof, and is provided at one square or oblong surface with a fitting face 21 to which the support 11 is connected. The fitting face 21 has, as shown in FIGS. 2 and 3, a given width extending radially outwardly of the seat tube and a given height extending lengthwise thereof.

The support 11 of the shifting mechanism 10 mounted to the fitting member 9 is, as shown in FIG. 2, formed of a metallic plate of a substantially right-angled triangle shape looking from the front, and is attached to the fitting member 9 with the base of triangle on top, carrying the connecting members 15 and 16 along the hypotenuse. At one surface formed by the base and altitude of the triangle is provided a connecting face 22 facing the fitting face 21 of the fitting member 9.

At the fitting face 21 and connecting face 22 constituted as aforegoing are provided a first adjusting means for adjusting the chain guide 13 in its position with respect to each of the sprockets 3 radially thereof and a second adjusting means for adjusting an angle of the straight line lengthwise of the chain guide 13 with respect to the common axis of the sprockets 3. Between the fitting member 9 and support 11 is provided a fixing means 25 for fixing the support 11 at a desirable position on the fitting face 21.

The first adjusting means is so constituted that one of the connecting face 22 and fitting face 21, preferably the latter, is made to have a given vertical length to be hereinafter called the length L larger than that within which the chain guide 13 is adjustable upwardly and downwardly so that the connecting face 22 may be movable upwardly and downwardly with respect to the fitting face 21. In FIG. 4, the fitting face 21 has the given length L and the connecting face 22 has the vertical length smaller than L, so that the face 22 may be movable upwardly and downwardly along the face 21. As noted, the connecting face 22 may conversely have the given vertical length.

Therefore, the connecting face 22 is moved upwardly and downwardly within the length L with respect to the fitting face 21 so as to make the position of support 11 adjustable upwardly and downwardly within the adjusting range with respect to the fitting member 9. As a result, the chain guide 13 carried with the support 11 through the connecting members 15 and 16 and movable member 14, can be adjusted in its position with respect to each of the sprockets in the radial direction thereof.

The second adjusting means is so constituted that the fitting face 21 and connecting face 22 are formed respectively in a circular arc around a center line X—X in the longitudinal direction of the seat tube 1a. Both the circular arcs have the same curvature to the center line X—X, and if one of the fitting and connecting faces is concave the other is convex, and vice versa. Also, both the concave and convex surfaces are in close contact with each other and allow the support 11 to be turned around the line X—X with respect to the fitting member 9. Thus, the support 11 is, as shown in FIGS. 3 and 4, swollen at its one surface opposite to the fitting member 9 to be formed in a convex shape and the fitting member 9 is recessed in a concave shape.

In the above construction, the support 11 shown in FIG. 3 is turned clockwise with respect to the fitting member 9 to allow the guide plates 12 to move at the foremost ends thereof from the position corresponding to the sprockets 3 toward the seat tube 1a with respect to the tails, thus adjusting to increase an angle α as shown between the common axis K of the sprockets 3 and the longitudinal line S of the guide plate 12, in other words, the deflection of the guide plate with respect to the line perpendicular to the axis of the sprocket. Conversely, the support 11 is turned counterclockwise to shift the chain guide so that the foremost end thereof approaches the position corresponding to the sprocket, thus decreasing the angle α. The second adjusting means enables the chain guide 13 to be adjusted in the angle α between the line S and the axis K.

The, fixing means 25 is adapted to be operated to fix or release the support 11 to or from the fitting member 9 and enables the support 11, after being released, to have its fixed position desirably changed at the fitting face 21 by means of the first and second adjusting means.

The fixing means 25 may take one of three forms. A first, form comprises a headed screw member such as a headed screw, which projects through a hole bored at one of the fitting member 9 and support 11 and which is screwed with a thread at the other member 9 and support 11. A second form comprises a bolt and a nut screwed thereto, the bolt being fixed to one of the fitting member 9 and support 11 and projecting through the other. A third form comprises a headed bolt 26 and a nut 27 screwed thereto and a through hole 28 bored at both the fitting member 9 and support 11 through which the bolt passes. The first form utilizes a plurality of the through holes and threaded holes arranged vertically at one of the fitting member 9 and support 11, and the second and the third forms have a slot or a plurality of round bores formed at one of the fitting member and support, thus making it possible to fix the support 11 upwardly and downwardly onto the fitting face 21. In addition, the one of fitting member 9 and support 11 having the slot or the plurality of round holes should be made the aforesaid given length L.

The third fixing means will be exemplified in FIGS. 3 and 4.

The third fixing means comprises a headed bolt 26 and a nut 27 screwed therewith. A through hole 31 is formed at the support 11 to open at the connecting face 22, and a slot 28 extending vertically of the fitting face 21 is formed at the fitting member 9 open at the face 21, the slot 28 being long correspondingly to the adjustable range of the chain guide 13. A width of the slot 28 and an inner diameter of the hole 31 are made considerably larger than an outer diameter of the bolt 26. The bolt 26 has a countersunk semispherical head 26a and the support 11 has at the back side of the connecting face 22 a concave recess 30 in close contact with the countersunk head 26a, the head 26a and recess 30 being insertably engageable with each other.

With the construction shown in FIGS. 3 and 4, the support 11 is adjustable in its position with respect to the fitting member 9 as the bolt 26 is kept perpendicular with respect to the latter, and can be fixed reliably by tightening the nut 27 regardless of the adjusting position of the support.

Furthermore, as seen from FIG. 4, the fitting face 21 is tapered downward and rightward as viewed in the drawing, that is, it becomes thinner in thickness downwardly, so that the fitting face 21 may be slant with respect to the longitudinal center line of the seat tube 1a when the fitting member 9 is attached thereto. This formation, detailed hereinafter, forms the chain guide 13 to be moved on the line slant to the longitudinal center line of the seat tube 1a when the support 11 is movably adjusted radially of each of the sprockets, thereby slightly shifting the chain guide 13 longitudinally thereof. This adjusts the angle between the line extending lengthwise of the guide plate 12 and the tangent to the outer periphery of the sprocket 3 at the point corresponding to the area of the guide plate guiding the chain (which angle is hereinafter called the fitting angle $\beta$). Hence, the chain guide 13 is positioned to fit accurately to the outer periphery of the sprocket to thereby change the speed reliably and smoothly. Alternatively, the fitting member 9, rather than being tapered may be uniformly thick but attached to the seat tube 1a in relation of being slant with respect to the longitudinal center line thereof, thus obtaining the same object as the tapered fitting member 9.

In the constuction shown in FIGS. 3 and 4, when the chain guide 13 is required to be adjusted upwardly and downwardly with respect to each of the sprockets 3 which, for example, may occur if one sprocket is replaced by a different diameter sprocket, the nut 27 is loosened to move the support 11 upwardly or downwardly is desired with its connecting face 22 moving along the fitting face 21 within the slot 28. When adjusting the angle $\alpha$ between the line K parallel to the axis of the sprocket and the line S extending longitudinally of the guide plate 12, the nut 27 is loosened to turn the support 11 through its connecting face 22 with respect to the fitting face 21 around the center line of the circular arc thereof.

Furthermore, the FIGS. 3 and 4 construction makes it possible to adjust the fitting angle $\beta$ simultaneously with the vertical position. In detail, since the fitting face 21 is slant with respect to the longitudinal center line of the seat tube 1a, the chain guide 13 carried with the support 11 is movably adjustable transversely with respect to the center line as well as being adjusted by being upwardly and downwardly movable. Referring to FIG. 5, for example, when the chain guide 13 is upwardly and downwardly positionally adjusted with respect to the sprocket b which replaces a larger diameter sprocket a, the chain guide 13 is, if adjusted by sliding the conventional tightening band, moved along the longitudinal center line m of the seat tube 1a. Hence, when the chain guide 13 moves to reach the outer periphery of the smaller diameter sprocket b, the foremost end of the guide plate 12 is, as shown by the dot and dash line, shifted circumferentially of the sprocket b with respect to the outer periphery of the sprocket a, thereby considerably changing the fitting angle with respect to the sprocket b. As a result, the chain guide 13 cannot guide the chain 5 reliably.

With the present invention, however, the support 11 is moved along the line n on the fitting face 21, the line n being inclined with respect to the longitudinal center line m of the seat tube 1a and crossing no axis of the sprockets 3, so that the chain guide 13 is positioned ahead of the center line m as shown by the solid line, thereby being positionally adjusted properly with respect to the outer periphery of the smaller diameter sprocket b keeping a proper fitting angle with respect thereto. As a result, the chain guide 13 guides the chain 5 reliably and smoothly for changing the speed.

After all adjustments are made, the nut 27 is tightened to urge the bolt head 26a is continuous close contact with the recess 30 due to equally arcuate surfaces thereof, thereby firmly holding the support 11. Then, the control wire is pulled to move the connecting members 15 and 16 as a parallelogram and the chain guide 13 is moved axially of the sprockets 3 through the movable member, thereby switching the chain 5 to a desirable sprocket for changing the speed.

In addition, it will be easily understood that the fixing means, which employs the headed bolt 26 and nut 27 and the slot 28 at the fixing member 9, may have a plurality of round holes in place of the slot. Also, the first embodiment of the fixing means using the screw without the nut and using threaded round holes in place of the bolt 26 and slot 28 and the second embodiment using the bolt 26 directly fixed to one of the support 11 and fitting member 9 with a slot or a plurality of round holes formed at the other of them as shown in FIGS. 3 and 4, are not shown, but will be easily understood from the provided description.

As clearly understood from the above description, the front derailleur of the invention is advantageous in that the chain guide is desirably adjustable in its position with respect to the fitting member and the derailleur is, even though normally difficult, directly mountable to the bicycle frame accurately and quickly, thereby preventing the chain guide from being improperly positioned due to its shaking when attached in a conventional manner. Moreover, the derailleur is, once attached, fixed firmly so that it is always kept in a proper position. Still further, the directly mounted derailleur requires no mounting band which must be changed for different diameter frames, thereby being convenient to use by simply being attached to any frame regardless of its size while being inexpensive to produce.

While an embodiment of the invention has been shown and several described as eing exemplary of the invention, the invention is not limited to these embodiments but is defined solely by the following claims.

What is claimed is:

1. A front derailleur for a bicycle, which is used for selectively switching a driving chain among at least two sprockets, comprising:

a fitting member fixed non-movably to a bicycle frame extending upwardly in the vicinity of said sprockets, said fitting member having a fitting face extending radially outwardly of said frame toward said sprockets and vertically of said bicycle;

a shifting mechanism connected with said fitting member, said shifting mechanism comprising a support connected to said fitting member, a chain guide guiding said driving chain and having a guide plate extending forwardly and backwardly of said frame, a movable member carrying said chain guide, and connecting members mounting said movable member to said support so that said movable member is movable axially of each of said sprockets and toward at least two positions corresponding to each of said sprockets, said support having a connecting face opposite to and mating with said fitting face of the fitting member, a first adjusting means for adjusting said chain guide in its position with respect to each of said sprockets in a radial direction thereof, said adjusting means being formed by one of said fitting face and connecting face being made to have a vertical length larger than the length of the adjustment range of the chain guide, thereby enabling said connecting face to be movable upwardly and downwardly relative to said fitting face, a second adjusting means for adjusting an angle of the longitudinal line of said chain guide with respect to the common axis of said sprockets, said second adjusting means being formed by said fitting face and connecting face having complimentary mating surfaces formed in a circular arc located on the frame side of said sprockets around a center line extending upwardly and downwardly of said fitting face, and a fixing means for fixing said support of the shifting mechanism at a desirable position on said fitting face of the fitting member, said fixing means being operable to release said support from being fixed and allowing the relative positioning between said support and said fitting member to be changed after said support is released.

2. The front derailleur according to claim 1, wherein said fixing means comprises a headed screw member, a through hole formed at one of said fitting member and support, and a threaded hole screwed with said screw member formed at the other of said fitting member and support.

3. The front derailleur according to claim 2, wherein a plurality of said threaded holes are provided at one of said fitting member or support upwardly and downwardly thereof.

4. The front derailleur according to claim 1, wherein said fixing means comprises a bolt and a nut screwed therewith, said bolt being fixed to one of said fitting member and support, and a through hole through which said bolt projects being formed at the other of said fitting member and support.

5. The front derailleur according to claim 4, wherein a plurality of said through holes are provided at said fitting face of the fitting member upwardly and downwardly of said fitting face.

6. The front derailleur according to claim 4, wherein said through hole is formed as a slot extending upwardly and downwardly of said fitting face of the fitting member.

7. The front derailleur according to claim 1, wherein said fixing means comprises a headed bolt and a nut screwed therewith, and at least one through hole into which said bolt projects formed at each of said fitting member and support.

8. The front derailleur according to claim 7, wherein a plurality of through holes are provided at one of said fitting member and support arranged upwardly and downwardly of said fitting face of the fitting member.

9. The front derailleur according to claim 7, wherein one of said through holes provided at said fitting member and support is formed as a slot extending upwardly and downwardly of said fitting face of the fitting member.

10. The front derailleur according to claim 7, wherein said headed bolt has a countersunk semispherical head.

11. The front derailleur according to claim 1, wherein a semispherical recess is formed at the back side of said connecting face of the support, and said fixing means comprises a bolt having a countersunk spherical head adapted to mate with said recess, a through hole passing through said connecting face and the back side thereof, and said fitting member and a locking member screwed onto said bolt forcing the bolt head into close contact with said recess.

12. The front derailleur according to claim 1, wherein said fitting face of the fitting member and connecting face of the support are made slant with respect to the longitudinal direction of said frame.

13. The front derailleur according to claim 1, wherein said fitting member is fixed to said frame to be slant with respect to the longitudinal center line of said frame.

* * * * *